United States Patent
Suzuki et al.

(10) Patent No.: US 9,682,627 B2
(45) Date of Patent: Jun. 20, 2017

(54) CONSUMED POWER AMOUNT ESTIMATION APPARATUS

(71) Applicants: KABUSHIKI KAISHA TOSHIBA, Minato-ku (JP); TOSHIBA SOLUTIONS CORPORATION, Kawasaki-shi (JP)

(72) Inventors: Hiroyuki Suzuki, Hino (JP); Junichi Yamamoto, Fuchu (JP); Norikazu Hosaka, Higashiyamato (JP); Satoshi Sekine, Sagamihara (JP); Makoto Kano, Hachioji (JP); Shinichiro Kawano, Kawasaki (JP); Yasuomi Une, Kawasaki (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 30 days.

(21) Appl. No.: 14/622,351

(22) Filed: Feb. 13, 2015

(65) Prior Publication Data
US 2015/0151637 A1 Jun. 4, 2015

Related U.S. Application Data

(63) Continuation of application No. PCT/JP2013/072114, filed on Aug. 19, 2013.

(30) Foreign Application Priority Data

Aug. 17, 2012 (JP) ................. 2012-180866

(51) Int. Cl.
 *B60L 3/12* (2006.01)
 *B60R 16/023* (2006.01)
 *B60L 15/20* (2006.01)

(52) U.S. Cl.
 CPC ............ *B60L 3/12* (2013.01); *B60L 15/2045* (2013.01); *B60R 16/0236* (2013.01);
 (Continued)

(58) Field of Classification Search
 None
 See application file for complete search history.

(56) References Cited

U.S. PATENT DOCUMENTS 8,862,374 B2 * 10/2014 Maura ................ G01C 21/3697
 701/123
8,972,161 B1 * 3/2015 Koebler ............. G01C 21/3469
 340/995.27

(Continued)

FOREIGN PATENT DOCUMENTS

CN 101590832 A 12/2009
CN 102023018 A 4/2011

(Continued)

OTHER PUBLICATIONS

English translation of International Preliminary Report on Patentability and Written Opinion issued Feb. 26, 2015 in PCT/JP2013/072114.

(Continued)

*Primary Examiner* — Truc M Do
(74) *Attorney, Agent, or Firm* — Oblon, McClelland, Maier & Neustadt, L.L.P.

(57) ABSTRACT

According to an embodiment, there is provided a consumed power amount estimation apparatus including an estimation unit configured to estimate a power amount necessary for an electric vehicle having a similar power consumption tendency to run, based on a parameter used to compensate for information affecting power consumption by running of the electric vehicle based on consumed power amount informa- (Continued)

tion of each of a plurality of electric vehicles having similar power consumption tendencies.

5 Claims, 13 Drawing Sheets

(52) U.S. Cl.
CPC .............. *Y02T 10/645* (2013.01); *Y02T 10/72* (2013.01); *Y02T 10/7283* (2013.01)

(56) References Cited

U.S. PATENT DOCUMENTS

| | | | | |
|---|---|---|---|---|
| 8,989,053 | B1* | 3/2015 | Skaaksrud | H04W 12/06 370/255 |
| 8,989,954 | B1* | 3/2015 | Addepalli | H04W 4/046 370/328 |
| 2004/0039504 | A1* | 2/2004 | Coffee | B28C 5/422 701/482 |
| 2006/0142915 | A1* | 6/2006 | Isono | B60K 6/46 701/36 |
| 2008/0086323 | A1* | 4/2008 | Petrie | G06F 17/30386 705/342 |
| 2008/0086427 | A1* | 4/2008 | Wallace | G06Q 10/10 705/36 R |
| 2008/0262668 | A1* | 10/2008 | Yamada | B60K 6/46 701/22 |
| 2009/0132176 | A1* | 5/2009 | McConnell | G06Q 30/04 702/23 |
| 2009/0299558 | A1* | 12/2009 | Hidaka | B60K 6/48 701/22 |
| 2009/0326756 | A1* | 12/2009 | Fletcher | G01M 15/044 701/31.4 |
| 2010/0114473 | A1* | 5/2010 | Kono | G01C 21/3469 701/532 |
| 2011/0060495 | A1* | 3/2011 | Kono | B60W 40/072 701/31.4 |
| 2011/0184642 | A1* | 7/2011 | Rotz | G01C 21/3492 701/533 |
| 2011/0257879 | A1* | 10/2011 | Ishibashi | G01C 21/3469 701/533 |
| 2012/0190386 | A1* | 7/2012 | Anderson | G01C 15/04 455/456.3 |
| 2012/0203409 | A1 | 8/2012 | Sekijima et al. | |
| 2012/0232783 | A1* | 9/2012 | Calkins | G01C 21/3469 701/411 |
| 2012/0259646 | A1* | 10/2012 | Itaya | G06Q 30/0639 705/1.1 |
| 2012/0271547 | A1* | 10/2012 | Mori | B60L 11/184 701/527 |
| 2012/0330494 | A1* | 12/2012 | Hendrix | B60L 11/1838 701/29.3 |
| 2013/0024060 | A1* | 1/2013 | Sukkari | H04L 67/12 701/22 |

FOREIGN PATENT DOCUMENTS

| | | |
|---|---|---|
| EP | 2 127 985 A2 | 12/2009 |
| EP | 2 660 791 A1 | 11/2013 |
| JP | 2002-350152 A | 12/2002 |
| JP | 2005-184867 A | 7/2005 |
| JP | 2006-115623 A | 4/2006 |
| JP | 2009-031046 A | 2/2009 |
| JP | 2009-290940 A | 12/2009 |
| JP | 2010-197211 A | 9/2010 |
| JP | 2010-210271 A | 9/2010 |
| WO | WO 2011078136 A1 | 6/2011 |
| WO | WO 2012090703 | 7/2012 |

OTHER PUBLICATIONS

International Search Report issued Nov. 19, 2013 for PCT/JP2013/072114 filed on Aug. 19, 2013 with English Translation.
Written Opinion issued Nov. 19, 2013 for PCT/JP2013/072114 filed on Aug. 19, 2013.
Extended European Search Report issued on May 13, 2016 in European Patent Application No. 13879373.2.
Mathieu Grossard, et al. An Optimal Energy-based Approach for Driving Guidance of Full Electric Vehicles, Industrial Electronics (ISIE), IEEE International Symposium on, XP032199962, May 28, 2012, pp. 1708-1713.
Farzad Rajaei Salmasi., "Control Strategies for Hybrid Electric Vehicles: Evolution, Classification, Comparison, and Future Trends", IEEE Transactions on Vehicular Technology, XP011192648, vol. 56, No. 5, Sep. 2007, pp. 2393-2404.
Chinese Office Action issued Feb. 20, 2017 in Chinese Application No. 201380043435.8 (no English translation), 10 pages

* cited by examiner

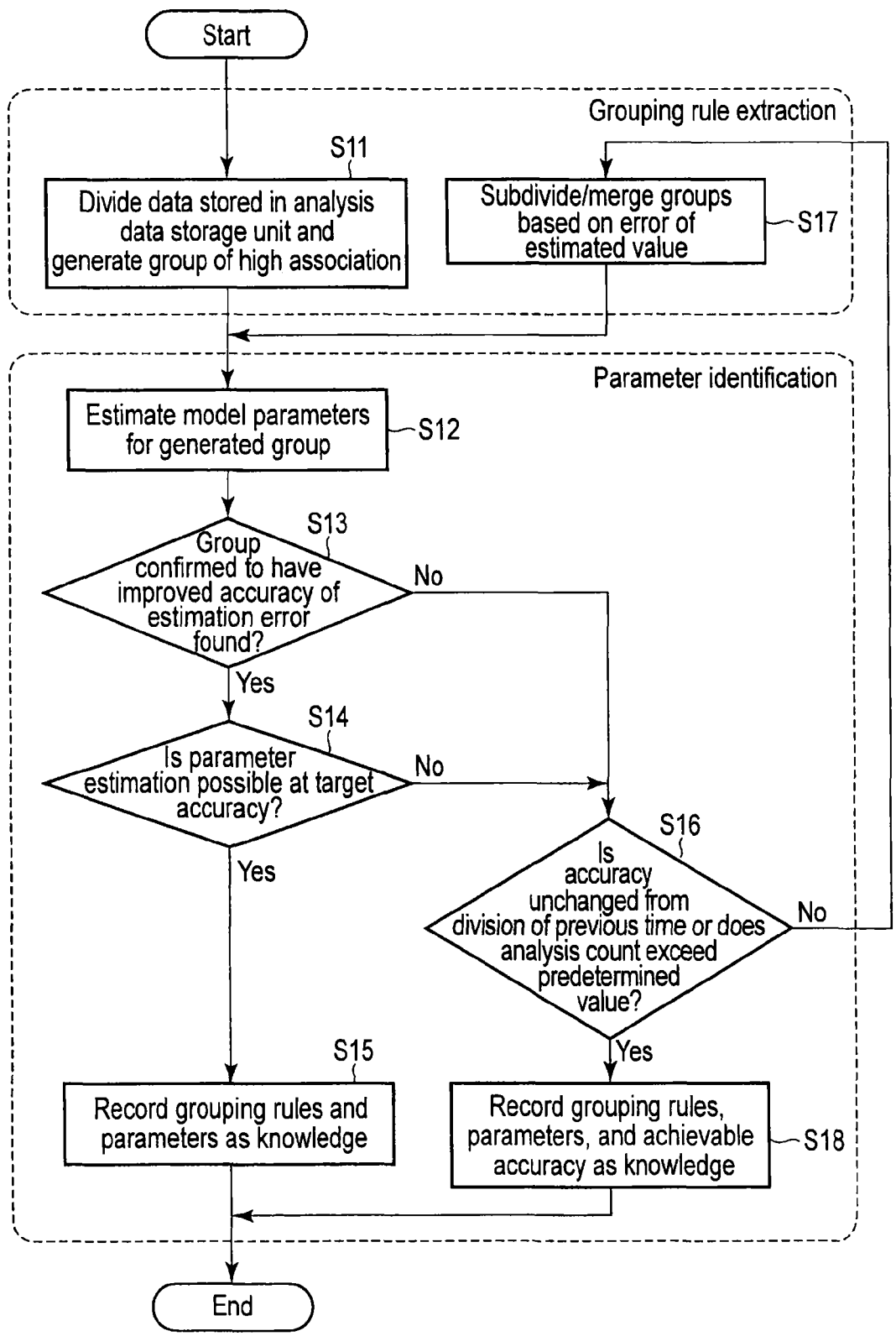
F I G. 3

| Driver ID | Average speed (km/h) | Average accelerator acceleration (km/S²) | Average braking acceleration (km/S²) | Acceleration/ deceleration frequency | Air conditioner set temperature (°C) | ...... |
|---|---|---|---|---|---|---|
| D1 | 30 | 0.1 | 0.1 | 2 | 25 | ...... |
| D2 | 40 | 0.3 | 0.3 | 5 | 22 | ...... |
| ...... | | | | | | |

F I G. 5

| ID | Date/time | Road piece ID | EV body ID | EV model ID | Driver ID | Average speed (km/h) | Acceleration/ deceleration frequency | Power consumption | ...... |
|---|---|---|---|---|---|---|---|---|---|
| 1 | 2012/3/1 10:00 | R1 | EV1 | Type1 | D1 | 20 | 2 | 0.010 | ...... |
| 2 | 2012/3/1 10:01 | R2 | EV2 | Type2 | D1 | 25 | 3 | 0.015 | ...... |
| :... | ... | .... | | | | | | | |
| n | 2012/3/1 15:30 | R8 | EV5 | Type3 | D8 | 50 | 1 | 0.005 | ...... |
| :... | .... | | | | | | | | |

F I G. 6

| Traffic information ID | Year, month and day | Day of week | Time | Road piece ID | Speed limit (km/h) | Average speed (km/h) | Number of passing vehicles per unit time | ...... |
|---|---|---|---|---|---|---|---|---|
| T1 | 2012/3/1 | Monday | 10:00 | R1 | 40 | 25 | 50 | ...... |
| T2 | 2012/3/1 | Monday | 10:10 | R1 | 40 | 20 | 80 | ...... |
| ...... | | | | | | | | |

F I G. 7

| Weather information log ID | Year, month and day | Day of week | Time | Location | Atmospheric temperature (°C) | Weather | Wind velocity (m/S) | ..... |
|---|---|---|---|---|---|---|---|---|
| W1 | 2012/3/1 | Monday | 10:00 | Location A | 10 | Clear | 2 | ..... |
| W2 | 2012/3/1 | Monday | 10:10 | Location A | 12 | Clear | 2.5 | ..... |
| ...... | | | | | | | | |

F I G. 8

| EV model ID | Name | Storage battery capacity (kwh) | Vehicle weight (kg) | Air resistance coefficient | Projected area (m$^2$) | Running efficiency | Regenerative energy efficiency | ..... |
|---|---|---|---|---|---|---|---|---|
| Type1 | Name1 | 15 | 1,000 | 0.4 | 25 | – | – | ..... |
| Type2 | Name2 | 25 | 1,200 | 0.3 | 22 | – | – | ..... |
| ...... | | | | | | – | – | |

F I G. 9

| Road piece ID | Start point | End point | Length (m) | Speed limit (km/h) | Gradient | Surface rolling resistance coefficient | ..... |
|---|---|---|---|---|---|---|---|
| R1 | (100,200) | (100,201) | 50 | 40 | – | – | ..... |
| R2 | (100,201) | (100,202) | 40 | 40 | – | – | ..... |
| R3 | (100,202) | (100,203) | 60 | 40 | – | – | ..... |
| R4 | (100,203) | (100,204) | 50 | 40 | – | – | ..... |
| ..... | | | | | – | – | |

F I G. 10

(a) (Grouping)
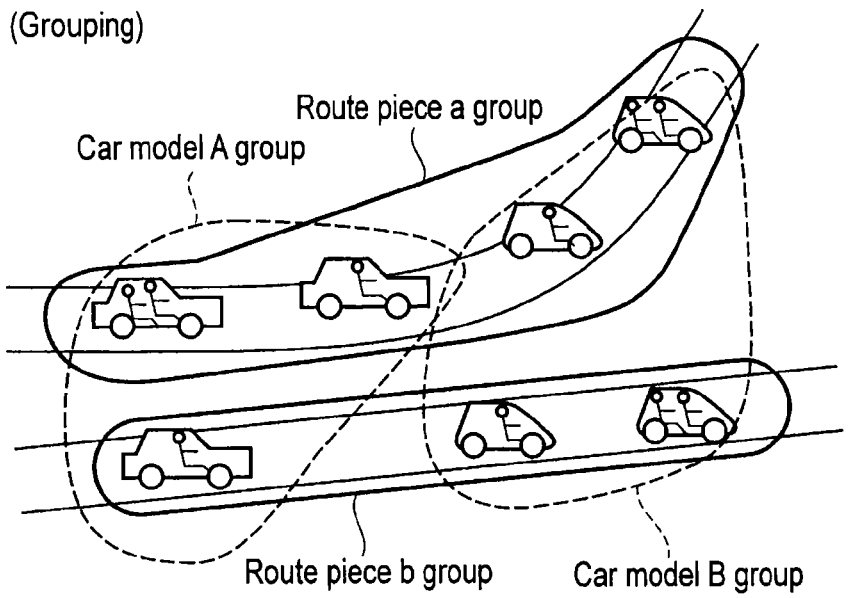
(b) (Parameter identification)
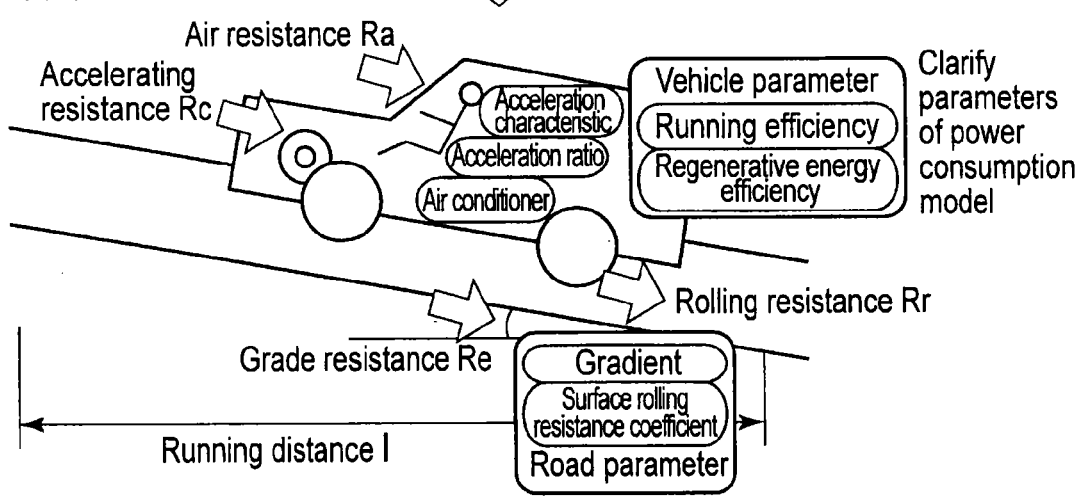
F I G. 11

| Rule ID | Model ID | Rule |
|---|---|---|
| 1 | Driver model | Individual |
| 2 | Vehicle model | Attribute designation |
| 3 | Road model | ID listing |
| 4 | Traffic information model | Attribute designation |

F I G. 12

| Group ID | Road piece ID |
|---|---|
| 1 | R1,R2,R3 |
| 2 | R4,R5 |
| …… | |

F I G. 13

| Group ID | Attribute |
|---|---|
| 1 | EV model ID |

F I G. 14

| Group ID | Value |
|---|---|
| 1 | — |

F I G. 15

| Group ID | Attribute |
|---|---|
| 1 | Day of week, time |

FIG. 16

| Road piece ID | Road group ID | Start point | End point | Length (m) | Speed limit (km/h) | Gradient | Surface rolling resistance coefficient | ..... |
|---|---|---|---|---|---|---|---|---|
| R1 | RGr1 | (100,200) | (100,201) | 50 | 40 | 0 | 0.2 | ..... |
| R2 | RGr1 | (100,201) | (100,202) | 40 | 40 | 0 | 0.2 | ..... |
| R3 | RGr1 | (100,202) | (100,203) | 60 | 40 | 0 | 0.2 | ..... |
| R4 | RGr2 | (100,203) | (100,204) | 50 | 40 | 0 | 0.25 | ..... |
| ..... | | | | | | | | |

FIG. 17

| EV model ID | EV group ID | Name | Storage battery capacity (kwh) | Vehicle weight (kg) | Air resistance coefficient | Projected area (m$^2$) | Running efficiency | Regenerative energy efficiency | ... |
|---|---|---|---|---|---|---|---|---|---|
| Type1 | EVGr1 | Name1 | 15 | 1,000 | 0.4 | 25 | 0.72 | 0.6 | ... |
| Type2 | EVGr2 | Name2 | 25 | 1,200 | 0.3 | 22 | 0.68 | 0.4 | ... |
| ....... | | | | | | | | | |

FIG. 18

| Driver ID | Driver group ID | Average speed (km/h) | Average accelerator acceleration (km/S²) | Average braking acceleration (km/S²) | Acceleration/ deceleration frequency | Air conditioner set temperature (°C) | ...... |
|---|---|---|---|---|---|---|---|
| D1 | D1 | 30 | 0.1 | 0.1 | 2 | 25 | ...... |
| D2 | D2 | 40 | 0.3 | 0.3 | 5 | 22 | ...... |
| ..... | | | | | | | |

F I G. 19

| Traffic information ID | Traffic information group ID | Year, month and day | Day of week | Time | Road piece ID | Speed limit (km/h) | Average speed (km/h) | Number of passing vehicles per unit time | ...... |
|---|---|---|---|---|---|---|---|---|---|
| T1 | TGr1 | — | Monday | 10:00 | R1 | 40 | 25 | 50 | ...... |
| T2 | TGr2 | — | Monday | 10:10 | R1 | 40 | 20 | 80 | ...... |
| ...... | | | | | | | | | |

F I G. 20

| Reservation ID | Reserver ID | Rental start date/time | Rental end date/time | Destination | ...... |
|---|---|---|---|---|---|
| 1 | Name1 | 2012/3/1 10:00 | 2012/3/1 13:00 | | ...... |
| 2 | Name2 | 2012/3/2 10:00 | 2012/3/2 15:00 | A station | ...... |
| ...... | | | | | |

F I G. 23

CONSUMED POWER AMOUNT ESTIMATION APPARATUS

CROSS-REFERENCE TO RELATED APPLICATIONS

This application is a Continuation Application of PCT Application No. PCT/JP2013/072114, filed Aug. 19, 2013 and based upon and claiming the benefit of priority from Japanese Patent Application No. 2012-180866, filed Aug. 17, 2012, the entire contents of all of which are incorporated herein by reference.

FIELD

Embodiments described herein relate generally to a consumed power amount estimation apparatus for estimating the running consumed power amount of an electric vehicle.

BACKGROUND

An electric vehicle will be referred to as an "EV" hereinafter. In the present application, the EV is not necessarily a four-wheeled vehicle, and a two-wheeled vehicle and a three-wheeled vehicle are also included. A plug-in hybrid vehicle capable of being externally charged is also an EV and expected to be widespread in the future. The EV uses no fossil fuel and therefore emits no exhaust gas such as carbon dioxide. Hence, the EV is expected as a last resort for energy saving and global warming suppression. The EV is also considered to serve as a storage battery for supplying power to a home or important facility in case of power failure caused by a disaster or the like. Hence, the EV has also received attention as a new social infrastructure.

The EV uses power stored in a storage battery to run. For this reason, the user of the EV needs to charge the EV, instead of refueling a conventional gasoline-powered vehicle. However, the time necessary to charge the current EV is longer than the time needed to refuel the gasoline-powered vehicle. In addition, the distance the EV can run by one charge is shorter than the distance the gasoline-powered vehicle can run by one refueling.

If the number of EVs running in urban districts grows in the future, it is feared that charging stations will be crowded by many EVs to be charged, power to EV charging facilities such as charging stations will fall in short supply, or the batteries of the EVs will be exhausted on the road.

Especially on expressways, there are fewer locations to build charging stations than on open roads because they can be built only in limited locations such as rest areas or stops. For this reason, reducing the dependency on specific charging stations and preventing battery exhaustion on the road may be important challenges.

For open roads as well, an operation plan needs to be made in consideration of the scheduled running distance of the EV, which is affected by the amount of electricity remaining in the storage battery of the EV, the time needed for charging, a variation in the power supply amount used for charging and the like in the fields of, for example, a shared vehicle as in car sharing or car rental, public transportation such as buses and taxis, and commercial vehicles for home delivery services and the like.

Hence, there is a demand for a technique of accurately estimating the distance the EV can run on the electricity remaining in its storage battery, the charging amount necessary to reach the destination, and the like.

Each auto manufacturer provides an estimated value of the runnable distance based on the storage battery level to a driver as a function of the EV manufactured by the manufacturer or a service for the driver of the EV manufactured by the manufacturer.

For example, there is a runnable distance estimation system that determines the parameters of a power consumption model from the running history of an EV. This technique adjusts, based on the running history of each EV, the parameters of the power consumption model of the single EV and improves the consumed power amount estimation accuracy.

There also exist a navigation apparatus and a destination reachability determination method that estimate the runnable distance based on partial information. In this technique, the apparatus for estimating the runnable distance itself is installed in the EV. However, in this technique, not only internal information of the EV but also information outside the EV is input, and the runnable distance is estimated based on the input information.

As described above, to distribute the load on the charging stations and prevent battery exhaustion of the EV, a road corporation needs to predict the charging action of the driver who is driving the EV running on the road.

Even when performing operation management for shared vehicles, taxis, or commercial vehicles such as a delivery car, the operation manager needs to grasp the charging amount necessary for the EV to run and the charging time necessary to charge the EV.

For such a business application purpose, the operation or charging needs to be managed for all EVs in a situation where not only EVs of a specific auto manufacturer or a specific car model but also EVs of various car models of various auto manufacturers coexist. However, there are the following problems in the current estimation of the consumed power amounts or runnable distances of EVs of various auto manufacturers.

Note that in the description of this specification, a term "consumed power amount" and a term "power consumption" are used. "Consumed power amount" represents the amount of power consumed by the EV and is used in, for example, an expression "estimation of a consumed power amount". "Power consumption" represents a phenomenon that the EV consumes power and is used in, for example, an expression "power consumption model".

As the first problem, there is no mechanism that allows other corporations such as an expressway corporation and an EV service provider to use the estimated values of consumed power amounts or runnable distances of EVs of various auto manufacturers.

As the second problem, the definition and accuracy of estimated values vary between the auto manufacturers.

As the third problem, the driver cannot effectively acquire and use knowledge of external factors that affect the power consumption of the EV.

The three problems will sequentially be explained below.

The first problem will be described. Each auto manufacturer notifies, concerning only EVs produced by the auto manufacturer, the driver of each EV of the estimated value of the runnable distance based on the remaining electricity amount of the storage battery. The estimated value is notified to the driver via, for example, a user interface such as the console of the driver's seat or a car navigation device.

However, auto manufacturers have not made the estimated values of runnable distances available in a form that allows other corporations such as an expressway corporation and an EV service provider to access from a computer system. Hence, for example, even when wanting to grasp the consumed power amount or runnable distance of an EV running on an expressway, the expressway corporation cannot use the estimated value of the consumed power amount or runnable distance by the auto manufacturer under the present circumstances.

The second problem will be described. Even if auto manufacturers make the estimated values of the consumed power amounts or runnable distances of EVs available to other corporations, the estimated values are insufficient as values used by corporations such as an expressway corporation that handles the EVs of a plurality of auto manufacturers.

This is because the definition and estimation accuracy of estimated values vary between the auto manufacturers or car models, and the estimated values cannot therefore be handled by the same standard. For example, in an EV model A1 of the electric vehicle of an auto manufacturer A, a margin of about 20% may be taken into consideration for the estimated value of the runnable distance. Note that this model presents the estimated value supposing a charge of about 20% remains in the storage battery even when the EV has run the estimated distance and consumed power as estimated.

For example, in an EV model B2 of an auto manufacturer B, an error of ±10% may be taken into consideration for the estimated value of the consumed power amount. In an EV model C3 of an auto manufacturer C, errors of +5% and −30% may be taken into consideration for the estimated value of the consumed power amount.

As described above, in a situation where the definition and estimation accuracy of estimated values are not determined, even if the auto manufacturers make the estimated values available to the corporations, it is impossible to sufficiently utilize the estimated values for operation management of all EVs of the auto manufacturers.

The third problem will be described. Power consumption of the EV is affected not only by the mechanical factors (motor, battery, body shape, and the like) of the EV itself but also by factors outside the EV.

The external factors can include, for example, weather such as an atmospheric temperature and wind, road conditions such as a road surface state and a gradient, traffic conditions such as a traffic jam, and factors depending on the driver (fast start, hard braking, and the like). Since these external factors change all the time, data derived from the external factors cannot always be included in the estimated apparatus installed in the EV or an external server connected via a network.

As a method of estimating the power consumption of the EV, a method of estimating the influence of the external factors on the power consumption based on the past running history of the EV can be considered. However, the running range in the past running history of each EV is limited. In addition, the states of the external factors that occurred during running of the EV are also limited. It is therefore difficult to cope with unknown external factors.

BRIEF DESCRIPTION OF DRAWINGS

FIG. 3 is a flowchart showing an example of the procedure of knowledge extraction by a knowledge extraction unit 13 of the EV running consumed power amount estimation apparatus;

FIG. 5 is a view showing an example of the data structure of driver information stored in the analysis data storage unit 12 in a table format;

FIG. 6 is a view showing an example of the data structure of EV running power consumption information stored in the analysis data storage unit 12 in a table format;

FIG. 7 is a view showing an example of the data structure of the traffic information log stored in the analysis data storage unit 12 in a table format;

FIG. 8 is a view showing an example of the data structure of the weather information log stored in the analysis data storage unit 12 in a table format;

FIG. 9 is a view showing an example of the data structure of the EV information stored in the analysis data storage unit 12 in a table format;

FIG. 10 is a view showing an example of the data structure of the road information stored in the analysis data storage unit 12 in a table format;

FIG. 11 is a view showing detailed examples of grouping and parameter identification;

FIG. 12 is a view showing a list of grouping rules applied in this embodiment;

FIG. 13 is a view showing an example of a road model grouping rule;

FIG. 14 is a view showing an example of a vehicle model grouping rule;

FIG. 15 is a view showing an example of a driver model grouping rule;

FIG. 16 is a view showing an example of a traffic information model grouping rule;

FIG. 17 is a view showing an example of road model parameters;

FIG. 18 is a view showing an example of vehicle model parameters;

FIG. 19 is a view showing an example of driver model parameters;

FIG. 20 is a view showing an example of traffic information model parameters;

FIG. 23 is a view showing an example of reservation application information.

DETAILED DESCRIPTION

In general, according to one embodiment, there is provided a consumed power amount estimation apparatus including a storage device configured to store information affecting power consumption by the running of an electric vehicle, and an extraction unit configured to extract consumed power amount information of each of a plurality of electric vehicles having similar power consumption tendencies from the information stored in the storage device. The consumed power amount estimation apparatus includes an estimation unit configured to estimate a power amount necessary for the electric vehicle to run based on a parameter used to estimate the power amount necessary for the electric vehicle to run using the information affecting power consumption by running of the electric vehicle as information based on the information extracted by the extraction unit.

The embodiments will now be described with reference to the accompanying drawings.

First Embodiment

The first embodiment will be described.

A mechanism of estimating the consumed power amount of an EV using past history data associated with power consumption of the EV and current data associated with power consumption of the EV will be proposed.

Figure 1:
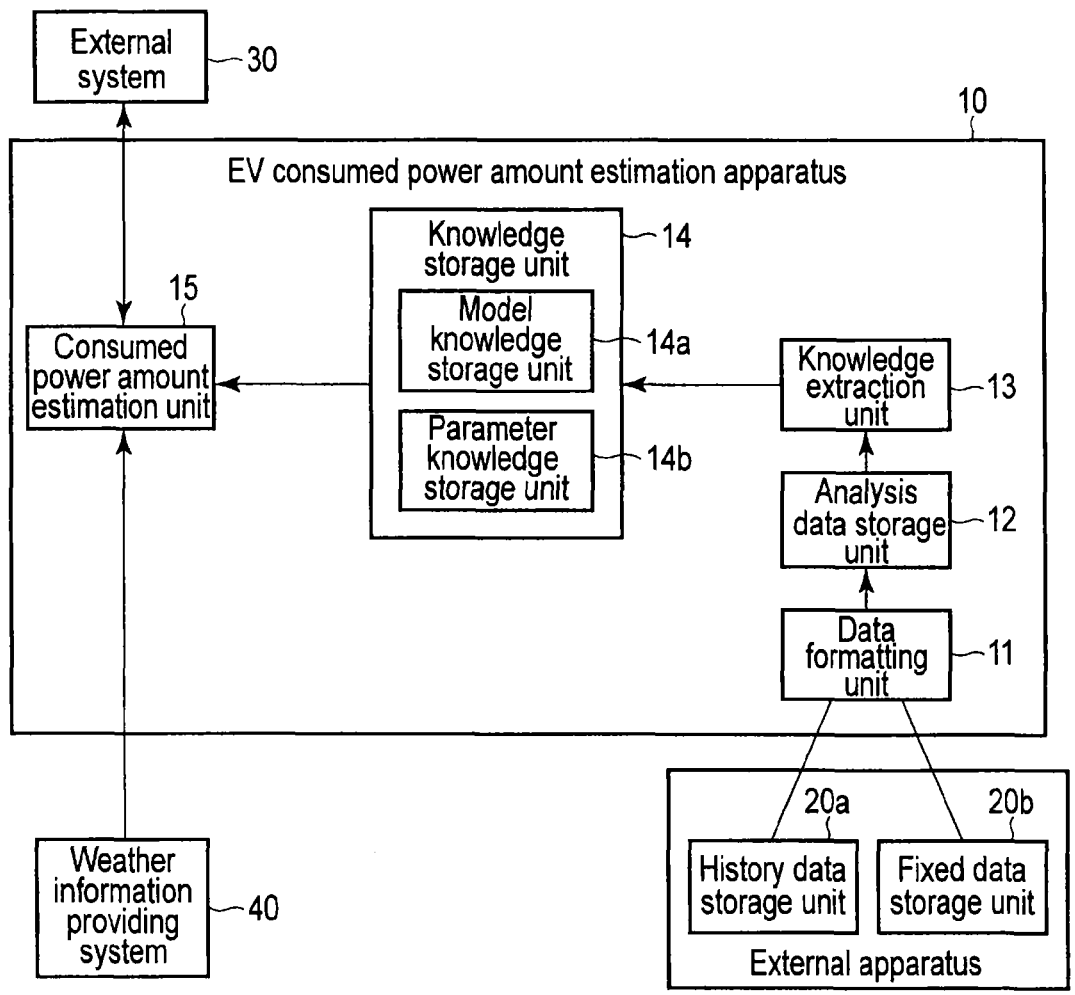
FIG. 1 is a block diagram showing an example of the arrangement of an EV running consumed power amount estimation apparatus.

FIG. 1 is a block diagram showing an example of the arrangement of an EV running consumed power amount estimation apparatus.

This EV running consumed power amount estimation system includes a data formatting unit 11, an analysis data storage unit 12, a knowledge extraction unit 13, a knowledge storage unit 14, and a consumed power amount estimation unit 15.

The data formatting unit 11 generates analysis data by referring to history data and fixed data that are information affecting power consumption by running of an EV. The data formatting unit 11 stores the analysis data in the analysis data storage unit 12 serving as a storage device. History data includes, for example, the running log of various EVs, a log concerning a driver's action, a log of weather information, and a log of traffic information.

The running log of EVs is not limited to the running log of a specific auto manufacturer or a specific car model. Fixed data includes, for example, catalog information (vehicle weight, air resistance coefficient, and the like) data of EVs and map information data.

An external apparatus 20 is provided with a history data storage unit 20a and a fixed data storage unit 20b. History data associated with EV power consumption is assumed to be stored in the history data storage unit 20a. Fixed data associated with EV power consumption is assumed to be stored in the fixed data storage unit 20b.

The types and amount of history data or fixed data usable for EV running consumed power amount estimation change depending on the application target. The EV running consumed power amount can also be called a power amount necessary for an electric vehicle to run from a certain time onward. In this embodiment, the types and amount of history data or fixed data are not particularly limited. History data other than the above-described various logs may be stored in the history data storage unit 20a. Fixed data other than the catalog information of EVs and map information data may be stored in the fixed data storage unit 20b.

The knowledge extraction unit 13 acts as an extraction unit that extracts consumed power amount information of each of a plurality of EVs having similar power consumption tendencies from the information stored in the analysis data storage unit 12 (storage device). The knowledge extraction unit 13 refers to the analysis data stored in the analysis data storage unit 12, extracts knowledge associated with EV power consumption from the analysis data storage unit 12, and stores it in the knowledge storage unit 14. The knowledge extracted here includes model knowledge serving as a scheme to express individual knowledge, and parameter knowledge that expresses individual detailed knowledge in accordance with the model knowledge.

The knowledge extraction unit 13 extracts a grouping rule from the analysis data stored in the analysis data storage unit 12 as model knowledge. The grouping rule is a rule used to specify a group having similar influence regarding EV running power consumption.

As for, for example, EVs, when EVs of the same car model have similar power consumption tendencies, each car model is used as a grouping unit. If EVs of the same car model exhibit different power consumption tendencies depending on the model year, a set of a car model and a model year is used as a grouping unit.

When the knowledge storage unit 14 is used, parameters used to compensate for information affecting power consumption by running of the EV can be identified based on the information extracted by the knowledge extraction unit 13. The model knowledge extracted from the knowledge extraction unit 13 is stored in a model knowledge storage unit 14a of the knowledge storage unit 14. The parameter knowledge extracted from the knowledge extraction unit 13 is stored in a parameter knowledge storage unit 14b.

Based on the information stored in the analysis data storage unit 12 (storage device) and various kinds of knowledge stored in the knowledge storage unit 14, the consumed power amount estimation unit 15 estimates a power amount necessary to run another EV having a similar tendency of power consumption by running. The consumed power amount estimation unit 15 estimates the consumed power amount necessary for the EV to run using the knowledge stored in the knowledge storage unit 14.

The consumed power amount estimation unit 15 is used by an arbitrary external system 30 that uses the consumed power amount estimation function. The external system is not particularly limited.

The knowledge extraction unit 13 and the consumed power amount estimation unit 15 can be executed asynchronously independently of each other. In the arrangement shown in FIG. 1, the knowledge extraction unit 13 and the consumed power amount estimation unit 15 share one knowledge storage unit 14. However, the knowledge extraction unit 13 and the consumed power amount estimation unit 15 need not always share a single knowledge storage unit. A detailed example will be described below.

Figure 2:
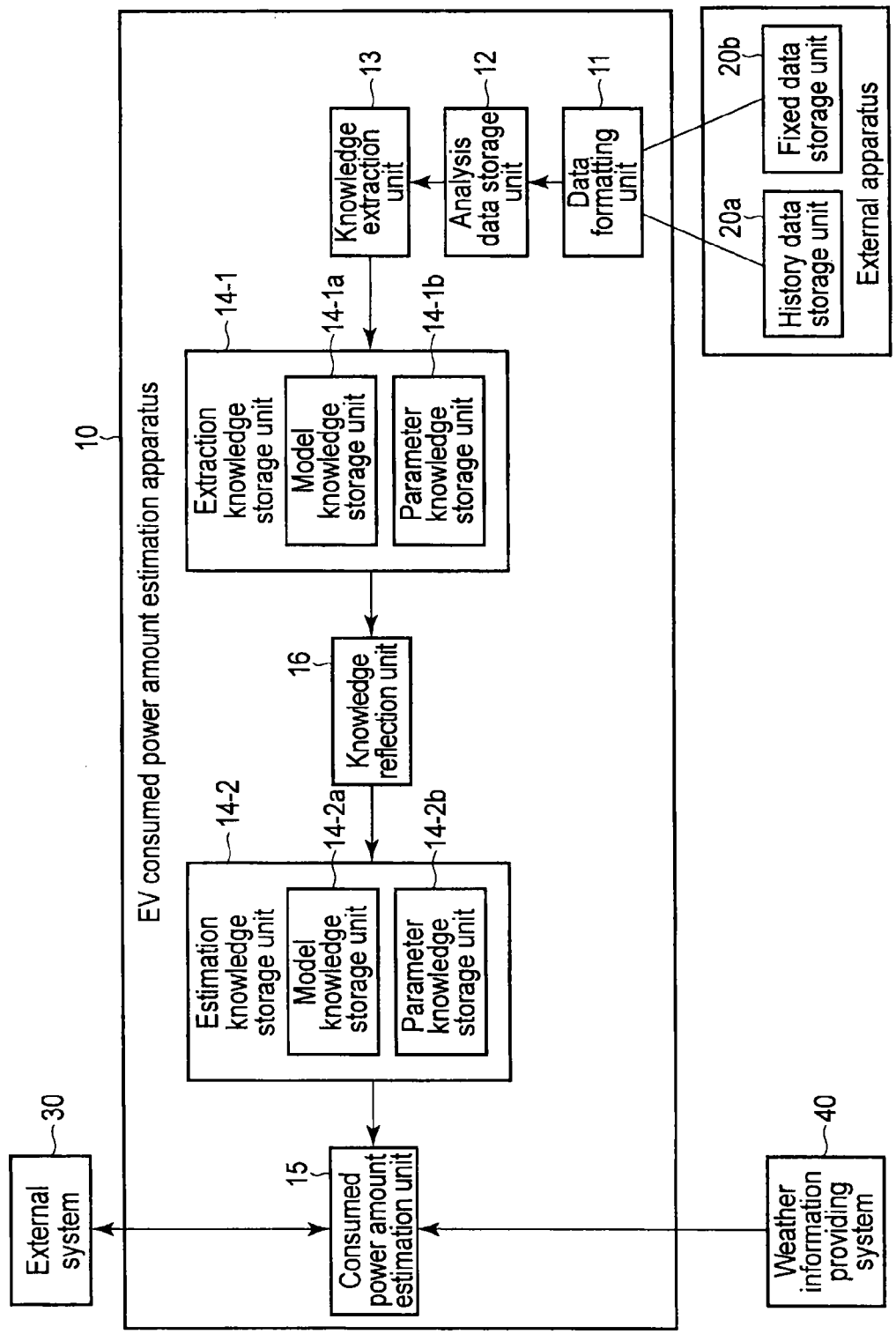
FIG. 2 is a block diagram showing a modification of the arrangement of the EV running consumed power amount estimation apparatus.

FIG. 2 is a block diagram showing a modification of the arrangement of the EV running consumed power amount estimation apparatus.

In this modification, an EV running consumed power amount estimation apparatus 10 further includes a knowledge reflection unit 16. Additionally, in this modification, the above-described knowledge storage unit 14 is divided into an extraction knowledge storage unit 14-1 for the knowledge extraction unit 13 and an estimation knowledge storage unit 14-2 for the consumed power amount estimation unit 15.

The knowledge reflection unit 16 reflects knowledge from the extraction knowledge storage unit 14-1 to the estimation knowledge storage unit 14-2 at a certain timing. The knowledge reflection unit 16 can be either automated as a system or manually made to perform reflection.

FIG. 3 is a flowchart showing an example of the procedure of knowledge extraction by the knowledge extraction unit 13 of the EV running consumed power amount estimation apparatus.

First, the knowledge extraction unit 13 divides the data stored in the analysis data storage unit 12. The knowledge extraction unit 13 generates groups having similar tendencies of power consumption by running of EVs based on the divided data (step S11). To do the division, the knowledge extraction unit 13 may use heuristics (simple and rough rule, method, clue, or empirical rule to solve a problem) based on human findings.

The knowledge extraction unit 13 estimates model parameters for each group generated in step S11 (step S12). If a group that is confirmed to have improved the accuracy of estimation error is found (YES in step S13), and parameters that satisfy the target accuracy of estimation error can be estimated (YES in step S14), the knowledge extraction unit 13 extracts the grouping rule of the group from the analysis data stored in the analysis data storage unit 12. The knowledge extraction unit 13 stores the extracted grouping rule in the model knowledge storage unit 14a. The knowledge extraction unit 13 stores the parameters estimated in step S12 in the parameter knowledge storage unit 14b (step S15).

If the accuracy of estimation error in data division of this time is not confirmed to have improved relative to data division of the previous time (NO in step S13), or if parameters that satisfy the target accuracy of estimation error cannot be estimated (NO in step S14), and the analysis count does not exceed a predetermined value (NO in step S16), the knowledge extraction unit 13 regenerates groups by subdividing or merging the groups based on the estimation error (step S17). The knowledge extraction unit 13 then performs the same procedure as that from step S12.

If the accuracy of estimation error in data division of this time is not confirmed to have improved relative to data division of the previous time (NO in step S13), or if parameters that satisfy the target accuracy of estimation error cannot be estimated (NO in step S14), and the analysis count exceeds the predetermined value (YES in step S16), the knowledge extraction unit 13 stores the grouping rule extracted in step S15 in the model knowledge storage unit 14a. The knowledge extraction unit 13 also stores the parameters estimated in step S12 in the parameter knowledge storage unit 14b, and stores information having an accuracy that can attain the estimation error in a predetermined storage area of the knowledge storage unit 14 (step S18).

The first embodiment will be described next.

In this embodiment, a typical example of extraction of knowledge by the knowledge extraction unit 13 and consumed power amount estimation using the knowledge will be explained.

Figure 4:
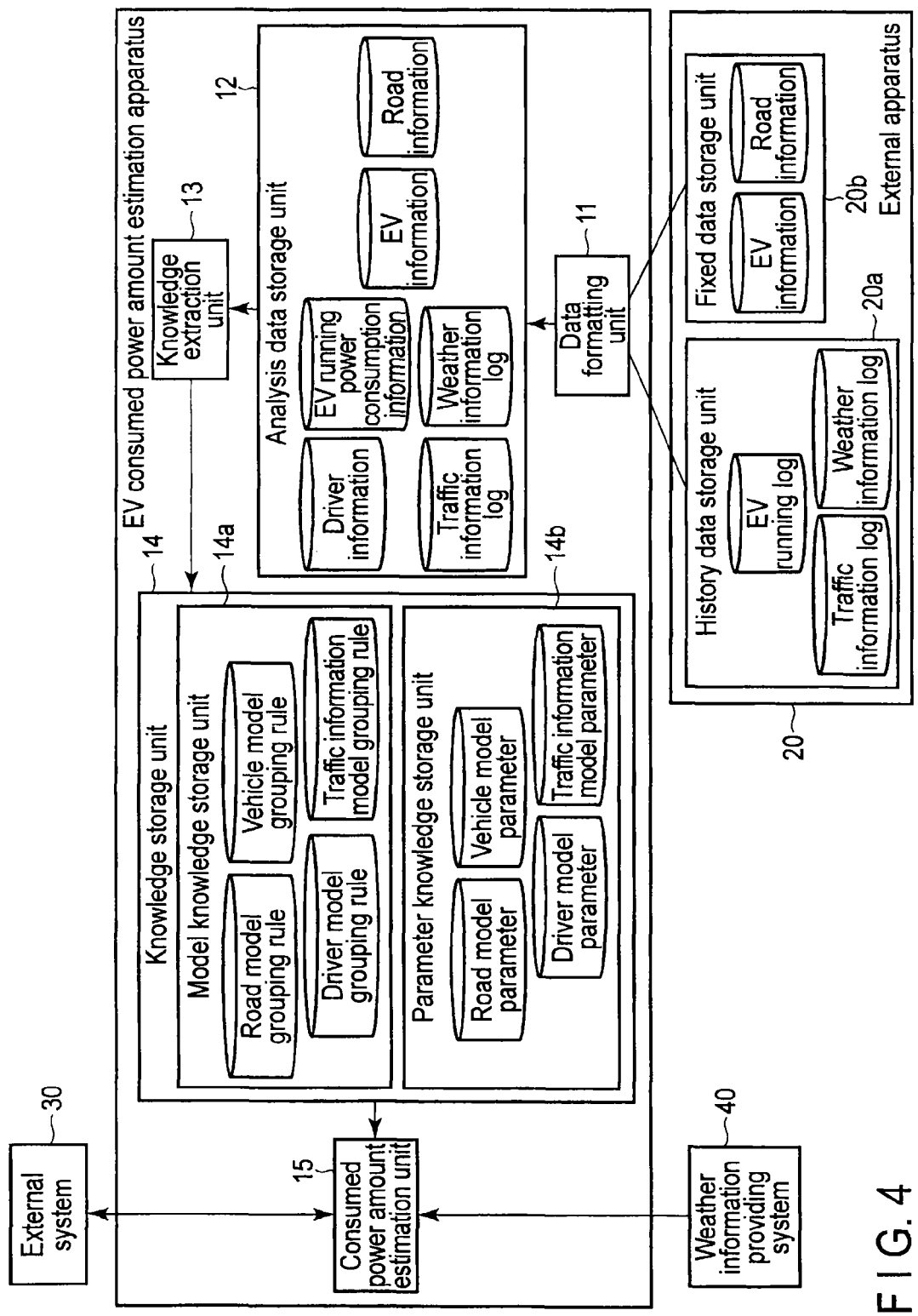
FIG. 4 is a block diagram showing an example of the system arrangement of the EV running consumed power amount estimation apparatus according to the first embodiment.

FIG. 4 is a block diagram showing an example of the system arrangement of the EV running consumed power amount estimation apparatus according to the first embodiment.

In this embodiment, the EV running consumed power amount estimation system includes the data formatting unit 11, the analysis data storage unit 12, the knowledge extraction unit 13, the knowledge storage unit 14, and the consumed power amount estimation unit 15, as described with reference to FIG. 4. In addition to the EV running consumed power amount estimation apparatus, the external apparatus 20, the external system 30 that uses the consumed power amount estimation function, and a weather information providing system 40 are provided.

The external apparatus 20 includes the history data storage unit 20a and the fixed data storage unit 20b. The history data storage unit 20a stores EV running log data, traffic information log data, and weather information log data. The fixed data storage unit 20b stores EV information data and road information data.

The data formatting unit 11 refers to the EV running log, the traffic information log, and the weather information log that are logs stored in the history data storage unit 20a of the external apparatus 20.

The EV running log is data collected via, for example, a roadside apparatus on an expressway.

The traffic information log is the history of, for example, a traffic control station. The weather information log is the history of, for example, the Meteorological Agency or the like. In this embodiment, the history data collection method, the history data access method, and the data format are not particularly determined.

The data formatting unit 11 also refers to the EV information data and the road information data that are data stored in the fixed data storage unit 20b of the external apparatus 20. The EV information data is data available from the catalog of an auto manufacturer. The road information data is data available from map data. In this embodiment, the data format is not particularly determined.

The analysis data storage unit 12 stores the data formatted by the data formatting unit 11. The data formatting unit 11 formats the various kinds of log data stored in the history data storage unit 20a of the external apparatus 20, thereby creating driver information and EV running power consumption amount information. The data formatting unit 11 stores the various kinds of created information in the analysis data storage unit 12.

As the traffic information log data to be stored in the analysis data storage unit 12, the traffic information log data stored in the history data storage unit 20a is directly used. As the weather information log data to be stored in the analysis data storage unit 12, the weather information log data stored in the history data storage unit 20a is directly used. As the EV information to be stored in the analysis data storage unit 12, EV information that is data stored in the fixed data storage unit 20b is directly used. As the road information to be stored in the analysis data storage unit 12, road information that is data stored in the fixed data storage unit 20b is directly used.

The model knowledge storage unit 14a of the knowledge storage unit 14 stores a driver model grouping rule, a vehicle model grouping rule, a road model grouping rule, and a traffic information model grouping rule that are the grouping rules of a driver model, a vehicle model, a road model, and a traffic information model. These are merely examples, and the grouping rules described here are not all grouping rules handled in this embodiment. For example, when running characteristics can be grouped by the set of a driver and a road representing that a certain driver runs on a certain road, a running model grouping rule for expressing the grouping rule of the set of a driver and a road can be prepared.

The parameter knowledge storage unit 14b of the knowledge storage unit 14 stores driver model parameters, vehicle model parameters, road model parameters, and traffic information model parameters that are the parameters of a driver model, a vehicle model, a road model, and a traffic information model. These are merely examples, and the parameters described here are not all parameters handled in this embodiment. For example, as described above, when running characteristics can be grouped by the set of a driver and a road representing that a certain driver runs on a certain road, running model parameters for expressing the parameters of the set of a driver and a road can be prepared.

The data structures of data stored in the analysis data storage unit 12 will be described next. FIGS. 5, 6, 7, 8, 9, and 10 show the data structures. These are merely examples, and the data described here are not all the data handled in this embodiment.

FIG. 5 is a view showing an example of the data structure of driver information stored in the analysis data storage unit 12 in a table format.

Various kinds of data that constitute the driver information are calculated and formatted by the data formatting unit 11 based on EV running log data acquired from the history data storage unit 20a of the external apparatus 20.

In the driver information, data affecting EV power consumption are calculated and stored by the data formatting unit 11 on a driver basis.

The stored data are (1) driver ID, unique to a driver, (2) average speed (km/h) of an EV driven by the driver, (3) average accelerator acceleration (km/s$^2$) that is the average acceleration of the EV when the driver presses the accelerator pedal of the EV, (4) average braking acceleration (km/s$^2$) that is the deceleration of the EV when the driver presses the brake pedal of the EV, (5) acceleration/deceleration frequency (%) of the EV by the driver, (6) set temperature (° C.) of the air conditioner in the EV driven by the driver, and the like. The acceleration/deceleration frequency is the ratio of a time of acceleration/deceleration to the whole running time of the EV.

FIG. 6 is a view showing an example of the data structure of EV running power consumption information stored in the analysis data storage unit 12 in a table format.

Data that constitute the EV running power consumption information are calculated and formatted by the data formatting unit 11 based on EV running log data acquired from the history data storage unit 20a of the external apparatus 20.

In the EV running log data, snapshot data at certain timings when a certain driver drives a certain EV, and the EV passes through a certain road piece (route piece) are listed. A road piece is generated by dividing a road into appropriate pieces.

As shown in FIG. 6, in the EV running power consumption information, data affecting EV power consumption are calculated and stored by the data formatting unit 11 on an EV running date/time basis.

The stored data are (1) current date/time, (2) road piece ID unique to a road piece, (3) EV body ID unique of an EV body, (4) EV model ID unique of an EV model, (5) driver ID, (6) average speed (km/h) when the EV passes through the road piece corresponding to the road piece ID, (7) acceleration/deceleration frequency (%) of the EV that passes through the road piece corresponding to the road piece ID, (8) consumed power amount (kWh) required by the EV corresponding to the EV body ID to pass through the road piece corresponding to the road piece ID, and the like.

FIG. 7 is a view showing an example of the data structure of the traffic information log stored in the analysis data storage unit 12 in a table format.

Various kinds of data that constitute the traffic information log are formatted by the data formatting unit 11 based on traffic information log data acquired from the history data storage unit 20a of the external apparatus 20.

In the traffic information log data, data affecting EV power consumption are calculated and stored by the data formatting unit 11.

The stored data are (1) traffic information ID unique to traffic information, (2) year, month and day of the traffic information, (3) day of week, (4) time, (5) road piece ID for the traffic information, (6) speed limit (km/h) on the road piece corresponding to the road piece ID, (7) average speed (km/h) of a vehicle that passes through the road piece corresponding to the road piece ID, (8) number of passing vehicles per unit time for the road piece corresponding to the road piece ID, and the like.

FIG. 8 is a view showing an example of the data structure of the weather information log stored in the analysis data storage unit 12 in a table format.

Various kinds of data that constitute the weather information log are formatted by the data formatting unit 11 based on weather information log data acquired from the history data storage unit 20a of the external apparatus 20.

Of the weather information log data, data affecting EV power consumption are calculated and stored by the data formatting unit 11. The stored data are (1) weather information log ID unique to weather information, (2) year, month and day of the weather information, (3) day of week, (4) time, (5) location information for the weather information, (6) atmospheric temperature (° C.) at the location represented by the location information, (7) weather at the location represented by the location information, (8) wind velocity (m/s) at the location represented by the location information, and the like.

FIG. 9 is a view showing an example of the data structure of the EV information stored in the analysis data storage unit 12 in a table format.

Various kinds of data that constitute the EV information are formatted by the data formatting unit 11 based on EV information data (catalog information made open by auto manufacturers) acquired from the fixed data storage unit 20b of the external apparatus 20.

In the EV information, data affecting EV power consumption are calculated and stored by the data formatting unit 11 on an EV basis. The stored data are (1) EV model ID unique to a car model to which an EV belongs, (2) name of the EV, (3) storage battery capacity (kWh) of the EV, (4) vehicle weight (kg), (5) air resistance coefficient, (6) projected area (m$^2$), (7) running efficiency, (8) regenerative energy efficiency, and the like. The columns of the running efficiency and regenerative energy efficiency in the EV information shown in FIG. 9 are blank because they are unavailable from the catalog information.

These blank columns are unnecessary as the data of the EV information. However, they are illustrated here in the EV information data to help understand an explanation later in comparison with data in the knowledge storage unit 14.

FIG. 10 is a view showing an example of the data structure of the road information stored in the analysis data storage unit 12 in a table format.

Various kinds of data that constitute the road information are formatted by the data formatting unit 11 based on road information data (see map information data) acquired from the fixed data storage unit 20b of the external apparatus 20.

In the road information, data affecting EV power consumption are calculated and stored by the data formatting unit 11 for each road piece generated by dividing a road into appropriate pieces. The stored data are (1) road piece ID unique to a road piece, (2) start point of the road piece corresponding to the road piece ID, (3) end point of the road piece corresponding to the road piece ID, (4) length (m) of the road piece, (5) speed limit (km/h) on the road piece, (6) gradient (radian), (7) surface rolling resistance coefficient, and the like. The columns of the gradient and surface rolling resistance coefficient in the road information are blank because they are unavailable from the map information data.

These blank columns are unnecessary as the data of the road information data. However, they are illustrated here in the road information to help understand an explanation later in comparison with data in the knowledge storage unit 14.

The operation of the knowledge extraction unit 13 will be described next.

The knowledge extraction unit 13 generates model knowledge and parameter knowledge in accordance with the procedure of knowledge extraction shown in FIG. 3.

The procedure of knowledge extraction according to this embodiment will be described. First, the knowledge extraction unit 13 divides the data of the EV running power consumption information stored in the analysis data storage unit 12 into appropriate groups. The knowledge extraction unit 13 estimates the parameters of each group. If it is confirmed as the result of estimation that the accuracy of estimation error has improved, the knowledge extraction unit 13 stores the new grouping rule in the model knowledge storage unit 14a of the knowledge storage unit 14. The knowledge extraction unit 13 also stores parameters to be identified for each group in the parameter knowledge storage unit 14b of the knowledge storage unit 14.

In this embodiment, at the time of grouping, human heuristics is incorporated. The reasons for grouping according to this embodiment and parameters to be identified for each group will be described below. FIG. 11 shows detailed examples of the grouping and parameter identification.

(1) When EV running power consumption information data is the running power consumption information data of a number of EVs that run on the same road piece line, the knowledge storage unit 14 identifies the characteristics (gradient, surface rolling resistance coefficient, and the like) of the road piece line in this grouping.

(2) When EV running power consumption information data is the running power consumption information data of a number of EVs belonging to the same car model, the knowledge storage unit 14 identifies the characteristics (running efficiency, regenerative energy efficiency, and the like) of each EV model in this grouping.

(3) When EV running power consumption information data is the running power consumption information data of a number of EVs that belong to the same car model and run on the same road piece line, the knowledge storage unit 14 identifies characteristics (surface rolling resistance coefficient and the like) by the interaction between the road and the EVs in this grouping.

By the procedures (1), (2), and (3) described above, the knowledge storage unit 14 obtains a first parameter and a second parameter.

The first parameter is a parameter used to compensate for road information about a road piece belonging to a predetermined road piece group based on the consumed power amount information (for example, EV running power consumption information data) of each of a plurality of EVs that pass through the road piece belonging to the predetermined road piece group as the consumed power amount information extracted by the knowledge extraction unit 13.

The second parameter is the consumed power amount information of each of a plurality of EVs belonging to a predetermined vehicle group (to be described later with reference to FIG. 14) having similar characteristics (for example, EV running power consumption information data) concerning power consumption as the consumed power amount information extracted by the knowledge extraction unit 13.

Based on the first and second parameters, the knowledge storage unit 14 identifies both the first and second parameters for parameters to compensate for the EV information of EVs belonging to the predetermined vehicle group. The knowledge storage unit 14 may identify only one of the first and second parameters. This also applies to other parameters to be described below other than those described above.

Alternatively, for example, drivers who drive in a similar way may be grouped. However, in this embodiment, drivers are individually handled without grouping in an explanation of grouping rules.

Model knowledge extracted by the knowledge extraction unit 13 will be described next.

Grouping rules extracted from the above-described viewpoint of grouping will be explained as the model knowledge.

FIG. 12 is a view showing a list of grouping rules applied in this embodiment.

In the example shown in FIG. 12, (1) rule ID unique to a grouping rule, (2) model ID unique to the model type of the grouping rule, and (3) rule item representing a grouping method for the model corresponding to the model ID are associated on a grouping rule basis. More specifically, in this embodiment, driver models are individually grouped, vehicle models are grouped by designating the attribute of EV models, road models are grouped by listing road piece IDs, and traffic information models are grouped by designating the attribute of traffic information.

In this embodiment, the grouping methods are managed by the grouping rule list shown in FIG. 12. However, the grouping rule list shown in FIG. 12 need not be particularly prepared if the grouping methods can be recognized by the individual grouping rules (FIGS. 13, 14, 15, and 16 to be described next).

FIGS. 13, 14, 15, and 16 show the grouping rules of road models, vehicle models, driver models, and traffic information models, respectively.

FIG. 13 is a view showing an example of a road model grouping rule.

Road models are grouped by listing road piece IDs, as described above. In this embodiment, several adjacent road piece lines are grouped assuming that they have the same characteristic affecting EV power consumption, and parameters are identified.

In the example shown in FIG. 13, adjacent road pieces R1, R2, and R3 are put into a group corresponding to a group ID "1", and adjacent road pieces R4 and R5 are put into a group corresponding to a group ID "2".

FIG. 14 is a view showing an example of a vehicle model grouping rule.

Vehicle (EV) models are grouped by designating an attribute, as described above. In this embodiment, vehicle models are grouped for each car model corresponding to an EV ID. In some cases, the vehicle models may be grouped by a set of a car model and a model year to further improve the estimation accuracy.

FIG. 15 is a view showing an example of a driver model grouping rule.

In this embodiment, drivers are individually handled without particularly grouping the driver models.

FIG. 16 is a view showing an example of a traffic information model grouping rule.

Traffic information models are grouped by designating an attribute. In this embodiment, the traffic information models are grouped by the day of week and the time zone.

Parameter knowledge extracted by the knowledge extraction unit 13 will be described next.

The parameters of each model identified by the above-described grouping will be explained here. FIGS. 17, 18, 19, and 20 show the parameters of road models, vehicle models, driver models, and traffic information models.

In this embodiment, some of the data structures (FIGS. 17, 18, 19, and 20) in the parameter knowledge storage unit 14b, which are extracted by the knowledge extraction unit 13, are expressed by adding columns to the data structures (FIGS. 5, 6, 7, 8, 9, and 10) in the analysis data storage unit 12, which are generated by the data formatting unit 11. However, these are merely examples, and the data structures in the parameter knowledge storage unit 14b may be completely different from those in the analysis data storage unit 12.

FIG. 17 is a view showing an example of road model parameters.

According to the example shown in FIG. 17, in the road model parameters, data affecting EV power consumption are associated on a road piece basis. The data affecting power consumption are (1) road piece ID, (2) road group ID determined based on the road model grouping rule, (3) start point of the road piece corresponding to the road piece ID, (4) end point of the road piece corresponding to the road piece ID, (5) length (m) of the road piece, (6) speed limit (km/h) on the road piece, (7) gradient, (8) surface rolling resistance coefficient, and the like.

As described above, the road model parameters are grouped by adjacent road pieces. In the road parameters, the knowledge extraction unit 13 gives the same road group ID that is an ID shown in FIG. 17 to rows corresponding to road pieces having similar characteristics affecting EV power consumption.

The road model parameters are different from the road information shown in FIG. 10 in that the road group ID is set. In the road parameters, the values of the gradient, surface rolling resistance coefficient, and the like are newly estimated as parameter values. The first reason why the values are estimated is because the EV running power consumption information data shows history data representing the consumed power amount when a number of EVs run on road pieces belonging to a group corresponding to a certain road group ID. The second reason is because the knowledge extraction unit 13 can estimate the characteristics of road pieces belonging to the group corresponding to the same road group ID based on the average speed, acceleration/deceleration, consumed power amount, and the like indicated by the EV running power consumption information.

FIG. 18 is a view showing an example of vehicle model parameters.

According to the example shown in FIG. 18, in the vehicle model parameters, data affecting EV power consumption are associated on an EV model basis. The data are (1) EV model ID, (2) EV group ID determined based on the vehicle model grouping rule, (3) name of the EV belonging to the EV group ID, (4) storage battery capacity (kWh), (5) vehicle weight (kg), (6) air resistance coefficient, (7) projected area (m²), (8) running efficiency, (9) regenerative energy efficiency, and the like.

As described above, in the vehicle model parameters, the knowledge extraction unit 13 gives the same EV group ID shown in FIG. 18 to rows corresponding to car models grouped by the EV model and having similar characteristics affecting EV power consumption.

In this embodiment, the vehicle model parameters are different from the EV information shown in FIG. 9 in that the EV group ID is set. In addition, the values of the running efficiency, regenerative energy efficiency, and the like are newly estimated as parameter values. The first reason why the parameters are estimated is because when the road model parameter values are estimated as shown in FIG. 17, the EV running power consumption information data shows the history data of power consumption when a number of EVs belonging to the same EV group run on road pieces belonging to each road group. The second reason is because the knowledge extraction unit 13 can estimate the characteristics of EVs (in this embodiment, corresponding to individual EVs) belonging to the group corresponding to the same vehicle group ID based on the average speed, acceleration/deceleration, consumed power amount, and the like indicated by the EV running power consumption information data.

FIG. 19 is a view showing an example of driver model parameters.

According to the example shown in FIG. 19, in the driver model parameters, data affecting EV power consumption are associated on a driver basis. The data are (1) driver ID, (2) driver group ID determined based on the driver model grouping rule, (3) average speed (km/h) of an EV driven by the driver belonging to the driver group ID, (4) average accelerator acceleration (km/s²), (5) average braking acceleration (km/s²), (6) acceleration/deceleration frequency (%), (7) air conditioner set temperature (° C.), and the like. The driver model parameters are different from the driver information data shown in FIG. 5 in that the driver group ID is further set.

In this embodiment, for the driver model parameters, the characteristics of drivers are individually handled without particularly grouping the drivers. For this reason, new knowledge about the driver information is not particularly extracted for the driver model. The knowledge extraction unit 13 directly uses the driver information data shown in FIG. 5, which are parameters stored in the analysis data storage unit 12, as the driver model parameters. Hence, the driver group IDs in the driver model parameters shown in FIG. 19 are the same as the driver IDs.

FIG. 20 is a view showing an example of traffic information model parameters.

According to the example shown in FIG. 20, in the traffic information model parameters, data affecting EV power consumption are associated. The data are (1) traffic information ID, (2) traffic information group ID determined based on the traffic information model grouping rule, (3) year, month and day of traffic information, (4) day of week, (5) time, (6) road piece ID for the traffic information, (7) speed limit (km/h) on the road piece corresponding to the road piece ID, (8) average speed (km/h) of a vehicle that passes through the road piece corresponding to the road piece ID, (9) number of passing vehicles per unit time for the road piece corresponding to the road piece ID, and the like. The traffic information model parameters are different from the traffic information data shown in FIG. 7 in that the traffic information group ID is further set.

As described above, the traffic information model parameters are grouped by the day of week and the time zone. In the parameters, the same traffic information group ID shown in FIG. 20 is given to rows corresponding to traffic information having similar characteristics affecting EV power consumption. This is because in this embodiment, the traffic state in the traffic information does not particularly change depending on the date, and the knowledge extraction unit 13 can specify a traffic state having a similar characteristic affecting power consumption of the EV based on a day of week and a time zone represented by traffic information.

The operation of the consumed power amount estimation unit 15 will be described next.

Figure 21:
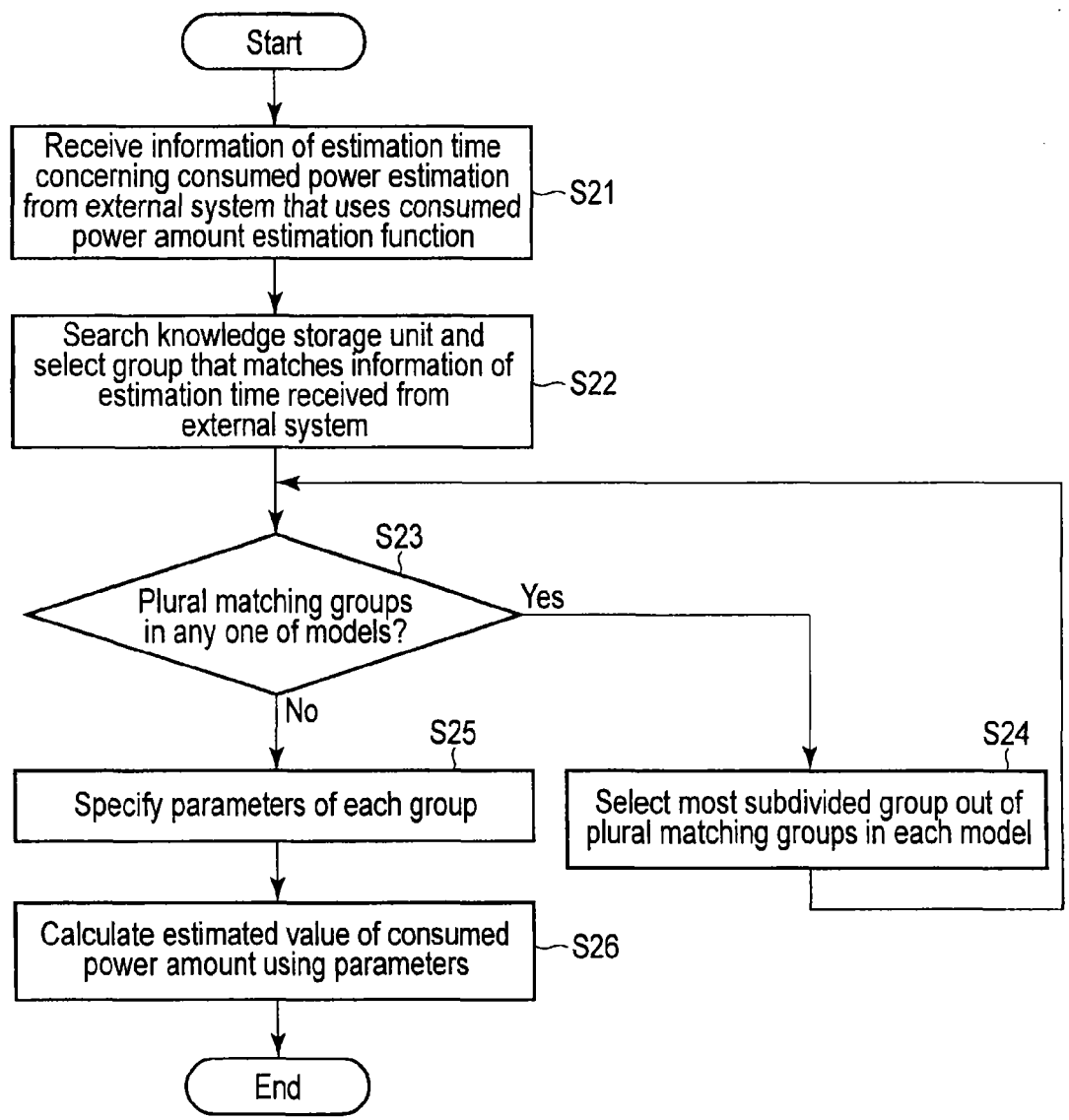
FIG. 21 is a flowchart showing an example of the procedure of consumed power amount estimation by a consumed power amount estimation unit 15.

A method of estimating a consumed power amount by the consumed power amount estimation unit 15 will be explained here. FIG. 21 is a flowchart showing an example of the procedure of consumed power amount estimation by the consumed power amount estimation unit 15.

First, the consumed power amount estimation unit 15 receives information at the consumed power amount estimation time concerning consumed power amount estimation from the external system 30 that uses the consumed power amount estimation function (step S21). Next, the consumed power amount estimation unit 15 searches the knowledge storage unit 14 and selects a group that matches the information at the consumed power amount estimation time from the external system 30 (step S22).

If there exist a plurality of matching groups in any one of the models (YES in step S23), the consumed power amount estimation unit 15 selects the most subdivided group out of the plurality of matching groups in each model (step S24).

If a plurality of matching groups do not exist (NO in step S23), the consumed power amount estimation unit 15 specifies the parameters of each group as shown in FIGS. 16, 17, 18, 19, and 20 (step S25). The consumed power amount estimation unit 15 calculates the estimated value of the consumed power amount of the EV using these parameters (step S26). The external system 30 can estimate the estimated value of the runnable distance of the EV based on the estimated value of the consumed power amount. In this embodiment, the method of calculating the estimated value of the consumed power amount is not particularly limited. The method of calculating the estimated value of the consumed power amount may be an arbitrary calculation method.

An example of the formula of calculating the estimated value of the consumed power amount according to this embodiment is $$\text{consumed power amount=running consumed power amount+consumed power amount irrelevant to running−regenerative energy amount} \quad (1)$$

The running consumed power amount in equation (1) is given by $$\text{running consumed power amount } Pe = \eta \times Pp \quad (2)$$

η: running efficiency
Pp: running work
The running work Pp of equation (2) is given by $$\text{running work } Pp = R \times l \quad (3)$$

R: running resistance
l: running distance
The running resistance R of equation (3) is given by $$\text{running resistance } R = Ra + Rr + Re + Rc \quad (4)$$

Ra: air resistance
Rr: rolling resistance
Re: grade resistance
Rc: accelerating resistance
The air resistance Ra of equation (4) is given by $$\text{air resistance } Ra = \tfrac{1}{2} \times \rho \times Cd \times A \times V^2 \quad (5)$$

ρ: air density
Cd: air resistance coefficient
A: projected area
V: speed
The rolling resistance Rr of equation (4) is given by $$\text{rolling resistance } Rr = \mu \times M \times g \times \cos\theta \quad (6)$$

μ: surface rolling resistance coefficient
M: gross vehicle weight
g: gravitational acceleration
θ: gradient The grade resistance Re of equation (4) is given by $$\text{grade resistance } Re = M \times g \times \sin\theta \quad (7)$$

The accelerating resistance Rc of equation (4) is given by $$\text{accelerating resistance } Rc = \alpha \times (M + Mi) \quad (8)$$

α: acceleration
Mi: rotating portion inertia weight

As indicated by equation (1), the consumed power amount is an amount obtained by subtracting the regenerative energy amount from the sum of the consumed power amount (running consumed power amount) necessary for the EV to run and the consumed power amount irrelevant to running.

As indicated by equation (2), the running consumed power amount is an amount obtained by multiplying the work (running work) necessary for running by the running efficiency.

As indicated by equation (3), the running work is proportional to the resistance (running resistance) on the vehicle at the time of running and the running distance.

As indicated by equation (4), the running resistance is the sum of the air resistance, the rolling resistance, the grade resistance, and the accelerating resistance.

The consumed power amount of the EV depends on the weather state such as the atmospheric temperature. When estimating the consumed power amount of the EV in consideration of the weather information, the consumed power amount estimation unit 15 acquires weather information data (see FIG. 8). The consumed power amount estimation unit 15 calculates the relationship between the location represented by the acquired weather information and the road piece represented by the EV running power consumption information. In consideration of the calculation result, the consumed power amount estimation unit 15 estimates the consumed power amount necessary for the EV to run. The weather information may be provided by the weather information providing system 40 shown in FIG. 1 or the like. The above-described weather information providing system 40 used to estimate the consumed power amount of the EV is arbitrary and is not particularly limited in this embodiment. When estimating the consumed power amount of the EV, the weather information need not always be acquired using the weather information providing system 40.

As described above, in the EV running consumed power amount estimation apparatus according to the first embodiment, it is possible to obtain high adaptability to new conditions, for example, driver information, traffic information, vehicle information, and the like in the function of estimating the consumed power amount necessary for an EV to run. In addition, the EV running consumed power amount estimation apparatus groups and analyzes EV running history data and the like, groups models used to estimate the consumed power amount, and estimates the consumed power amount of an EV belonging to a group specified by the grouping. This allows the EV running consumed power amount estimation apparatus to estimate the consumed power amount for various roads or a number of EV models.

Furthermore, the EV running consumed power amount estimation apparatus according to this embodiment can estimate the consumed power amount or runnable distance while reflecting the influence of factors outside the EV, which is an influence difficult to estimate by a single EV. The EV running consumed power amount estimation apparatus can also estimate the consumed power amount or runnable distance without depending on a specific auto manufacturer or car model.

The EV running consumed power amount estimation apparatus according to this embodiment can estimate the consumed power amount or runnable distance not only for a specific auto manufacturer or a specific car model but also for a plurality of auto manufacturers or a plurality of car models.

Second Embodiment

The second embodiment will be described next. Note that detailed descriptions of components according to this embodiment that are the same as the components described in the first embodiment will be omitted.

In the second embodiment, an example will be described in which when reserving a shared car or rental car, the consumed power amount at the time of rental is estimated from reservation information.

Figure 22:
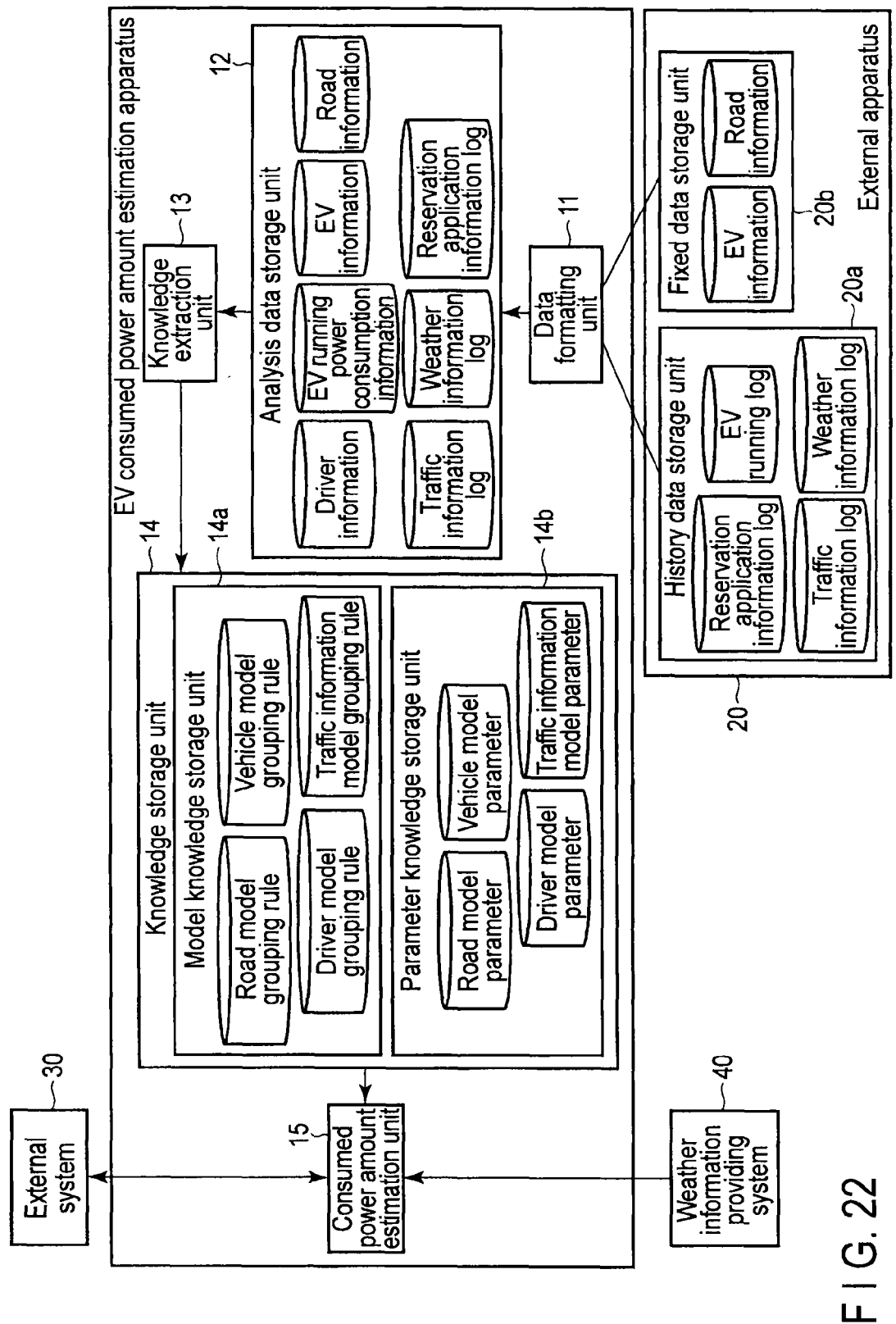
FIG. 22 is a block diagram showing an example of the system arrangement of an EV running consumed power amount estimation apparatus according to the second embodiment.

FIG. 22 is a block diagram showing an example of the system arrangement of an EV running consumed power amount estimation apparatus according to the second embodiment.

This system arrangement is almost the same as that of the first embodiment. This system arrangement according to the second embodiment is different from that of the first embodiment in that a reservation application information log to use an EV as a shared car or rental car is further stored in a history data storage unit 20a of an external apparatus 20. The reservation application information log is directly stored in an analysis data storage unit 12.

FIG. 23 is a view showing an example of reservation application information. The reservation application information includes information used by the user of a shared car or rental car to apply for a reservation. In the reservation application information, a reservation ID and a reserver ID are set as information to specify the driver as the EV rental destination. The reservation application information also describes a date/time for which the start of rental to the driver is scheduled, a date/time for which the end of rental is scheduled, and the destination of the EV scheduled to be rented. In the reservation application information, a departure location is set as fixed information.

In the second embodiment, even when an external system 30 that uses the consumed power amount estimation function invokes the function, the reservation application information is transferred to a consumed power amount estimation unit 15 as an argument, unlike the first embodiment.

The consumed power amount estimation unit 15 that has received the reservation application information as an argument specifies parameters concerning the EV scheduled to be rented of the parameters stored in a parameter knowledge storage unit 14b in accordance with the following procedure.

First, the consumed power amount estimation unit 15 specifies the driver who rents the EV scheduled to be rented and a group to which the driver belongs based on the reservation application information and driver model parameters (see FIG. 19). With this specifying, the consumed power amount estimation unit 15 specifies driver model parameters depending on the driver who rents the EV scheduled to be rented. The driver model parameters are, for example, the average speed of the driver, the average accelerator acceleration, the average braking acceleration, the acceleration/deceleration, and the like.

Next, based on the destination described in the reservation application information, the consumed power amount estimation unit 15 estimates the running route of the EV scheduled to be rented. Based on the estimated running route and road model parameters (see FIG. 17), the consumed power amount estimation unit 15 estimates a road piece of the estimated running route. The consumed power amount estimation unit 15 can thus specify the road model parameters (speed limit, gradient, and the like) for running of the EV scheduled to be rented.

The consumed power amount estimation unit 15 generates traffic jam information on the running route of the EV scheduled to be rented based on the rental start date/time and the rental end date/time described in the reservation application information, the road model parameters (see FIG. 17), and traffic information model parameters (see FIG. 20). Using the traffic jam information, the consumed power amount estimation unit 15 updates the road model parameters (speed limit and the like) for running of the EV scheduled to be rented.

The consumed power amount estimation unit 15 then estimates the atmospheric temperature and weather at the time of rental of the EV scheduled to be rented, which are the parameters of weather information at the time of EV rental, based on the rental start date/time and the rental end date/time described in the reservation application information and weather forecast information acquired from a weather information providing system.

When the car model of the EV scheduled to be rented is determined, the consumed power amount estimation unit 15 specifies vehicle model parameters concerning the EV scheduled to be rented based on the car model and vehicle model parameters (see FIG. 18).

Using the parameters of the driver model, road model, vehicle model, and weather information specified in accordance with the above-described procedure, the consumed power amount estimation unit 15 estimates the consumed power amount of the EV scheduled to be rented in accordance with the consumed power amount estimation algorithm shown in FIG. 21.

As described above, the EV running consumed power amount estimation apparatus according to the second embodiment can estimate the consumed power amount during rental of an EV scheduled to be rented based on reservation application information for rental of the EV, in addition to the features described in the first embodiment.

Since the reservation application information includes the information of the destination of the EV scheduled to be rented, the EV running consumed power amount estimation apparatus according to the second embodiment can generate traffic jam information on the running route of the EV based on the information and traffic information model parameters. It is therefore possible to raise the accuracy of the road model parameters as compared to the first embodiment.

While a certain embodiment has been described, this embodiment has been presented by way of example only, and is not intended to limit the scope of the inventions. Indeed, the novel embodiment described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A consumed power amount estimation apparatus comprising:
   a storage device configured to store information affecting power consumption by running of an electric vehicle;
   an extraction unit configured to extract consumed power amount information of each of a plurality of electric vehicles having similar power consumption tendencies from the information stored in the storage device; and an estimation unit configured to estimate a power amount necessary for the electric vehicle to run based on a parameter used to estimate the power amount necessary for the electric vehicle to run, using the information affecting power consumption by running of the electric vehicle as information based on the information extracted by the extraction unit, wherein the extraction unit extracts, from the information stored in the storage device, at least one of (a) vehicle model parameter information of each of the plurality of electric vehicles belonging to a predetermined vehicle group having a similar characteristic concerning power consumption, (b) road model parameter information of each of the plurality of electric vehicles that pass through a road piece belonging to a predetermined road piece group having a similar characteristic concerning power consumption by a passing vehicle, and (c) driver model parameter information concerning a driver belonging to a predetermined driver group having a similar characteristic concerning power consumption by the driver, and the estimation unit estimates the power amount necessary for the electric vehicle to run based on at least one of (d) a parameter used to estimate the power amount necessary for the electric vehicle concerning the vehicle belonging to the predetermined vehicle group to run, based on the vehicle model parameter information of each of the plurality of electric vehicles belonging to the predetermined vehicle group having the similar characteristic concerning power consumption as the information extracted by the extraction unit, (e) a parameter used to estimate the power amount necessary for the electric vehicle concerning the road piece belonging to the predetermined road piece group to run, based on the road model parameter information of each of the plurality of electric vehicles that pass through the road piece belonging to the predetermined road piece group as the information extracted by the extraction unit, and (f) a parameter used to estimate the power amount necessary for the electric vehicle concerning the driver belonging to the predetermined driver group to run, based on the driver model parameter information of the electric vehicle concerning the driver belonging to the predetermined driver group as the information extracted by the extraction unit.

2. The consumed power amount estimation apparatus according to claim 1, wherein the information stored in the storage device comprises at least one of (a) driver information as information that is unique to each of drivers of the plurality of electric vehicles and affects power consumption by running of the electric vehicle, (b) consumed power amount information representing a consumed power amount of the electric vehicle that passes through a road piece in a predetermined section at a predetermined date/time, (c) vehicle information as information that is unique to a car model of the electric vehicle and affects power consumption by running of the electric vehicle belonging to the car model, and (d) road information as information that is unique to the road piece in the predetermined section and affects power consumption by running of the electric vehicle.

3. The consumed power amount estimation apparatus according to claim 1, wherein the storage device further stores weather information that affects power consumption by running of the electric vehicle at a passage portion of the electric vehicle, and the estimation unit estimates the power amount necessary for the electric vehicle having a similar power consumption tendency to run, based on (a) information including the weather information as the information stored in the storage device, and (b) a parameter used to estimate the power amount necessary for electric vehicles having similar power consumption tendencies, based on the parameter used to estimate the power amount necessary.

4. The consumed power amount estimation apparatus according to claim 2, wherein the electric vehicle is a rental vehicle based on an application for rental reservation, the storage device further stores information representing a destination of the electric vehicle for which the application for rental reservation has been made, and the estimation unit (a) estimates, based on the information representing the destination, a road piece associated with a scheduled running route of the electric vehicle for which the application for rental reservation has been made, (b) acquires, as the estimated consumed power amount information, the consumed power amount information of the electric vehicle for which the application for rental reservation has been made as the electric vehicle that passes through the road piece associated with the scheduled running route of the electric vehicle for which the application for rental reservation has been made, based on the consumed power amount information of each of the plurality of electric vehicles that pass through a road piece belonging to a predetermined road piece group having a similar characteristic concerning power consumption by a passing vehicle as the consumed power amount information extracted by the extraction unit, and (c) estimates the power amount necessary for the electric vehicle to run, based on a parameter used to compensate for road information concerning the road piece belonging to the predetermined road piece group based on the acquired consumed power amount information.

5. The consumed power amount estimation apparatus according to claim 4, wherein the storage device further stores traffic information affecting power consumption by running of the electric vehicle that passes through the road piece in a predetermined section at a predetermined date/time, and a rental start date/time and a rental end date/time of the electric vehicle for which the application for rental reservation has been made, and the estimation unit (a) estimates traffic jam information in the scheduled running route based on the rental start date/time, the rental end date/time, the traffic information, and an estimation result of the road piece, and (b) estimates the power amount necessary for the electric vehicle to run based on the parameter used to compensate for the road information concerning the road piece belonging to the predetermined road piece group based on the estimated traffic jam information.

* * * * *